United States Patent [19]

Jenkins

[11] 4,078,709
[45] Mar. 14, 1978

[54] BALL LATCH SOLENOID AND TAPE TRANSPORT MECHANISM INCORPORATING SAME

[75] Inventor: John P. Jenkins, Towanda, Ill.

[73] Assignee: International Tapetronics Corporation, Bloomington, Ill.

[21] Appl. No.: 767,662

[22] Filed: Feb. 10, 1977

[51] Int. Cl.$^2$ .................. B65H 17/20; H01F 7/08
[52] U.S. Cl. .................................. 226/180; 226/181; 335/253; 361/194
[58] Field of Search ............... 335/253, 254; 361/194; 226/176, 177, 186, 187, 180, 181

[56] References Cited

U.S. PATENT DOCUMENTS

| | | | |
|---|---|---|---|
| 2,057,380 | 10/1936 | Keefe | 335/253 X |
| 2,887,623 | 5/1959 | Buecker | 361/194 |
| 3,113,708 | 12/1963 | Moulic | 226/181 |
| 3,582,981 | 6/1971 | Dalyai | 361/194 X |

Primary Examiner—Bruce H. Stoner, Jr.
Attorney, Agent, or Firm—McCaleb, Lucas & Brugman

[57] ABSTRACT

Solenoid has a coil which when energized moves a plunger inwardly through an opening in the housing against an external biasing spring which moves the plunger outwardly when the coil is deenergized. The front end wall of the housing has a plurality of bores disposed radially to the axis of movement of the plunger, each having a ferrous guide sleeve with an open end adjacent the plunger and a loose magnetic steel ball which is freely movable therein toward the plunger when the coil is energized. The plunger has an external groove within which the balls are seated when the plunger is in a fully retracted position. This enables the balls to extend from the open inner ends of the guide sleeves into latching positions holding the solenoid against outward movement. A much smaller electric power input is required in the coil to hold the balls in latched position, and therefore hold the plunger in retracted position, than is required to move the plunger to that position in the first place. One automatic control means is illustrated, using as an example a tape transport mechanism employing the improved solenoid, for reducing the electric current input to the coil automatically after the plunger is latched in the fully retracted position.

11 Claims, 8 Drawing Figures

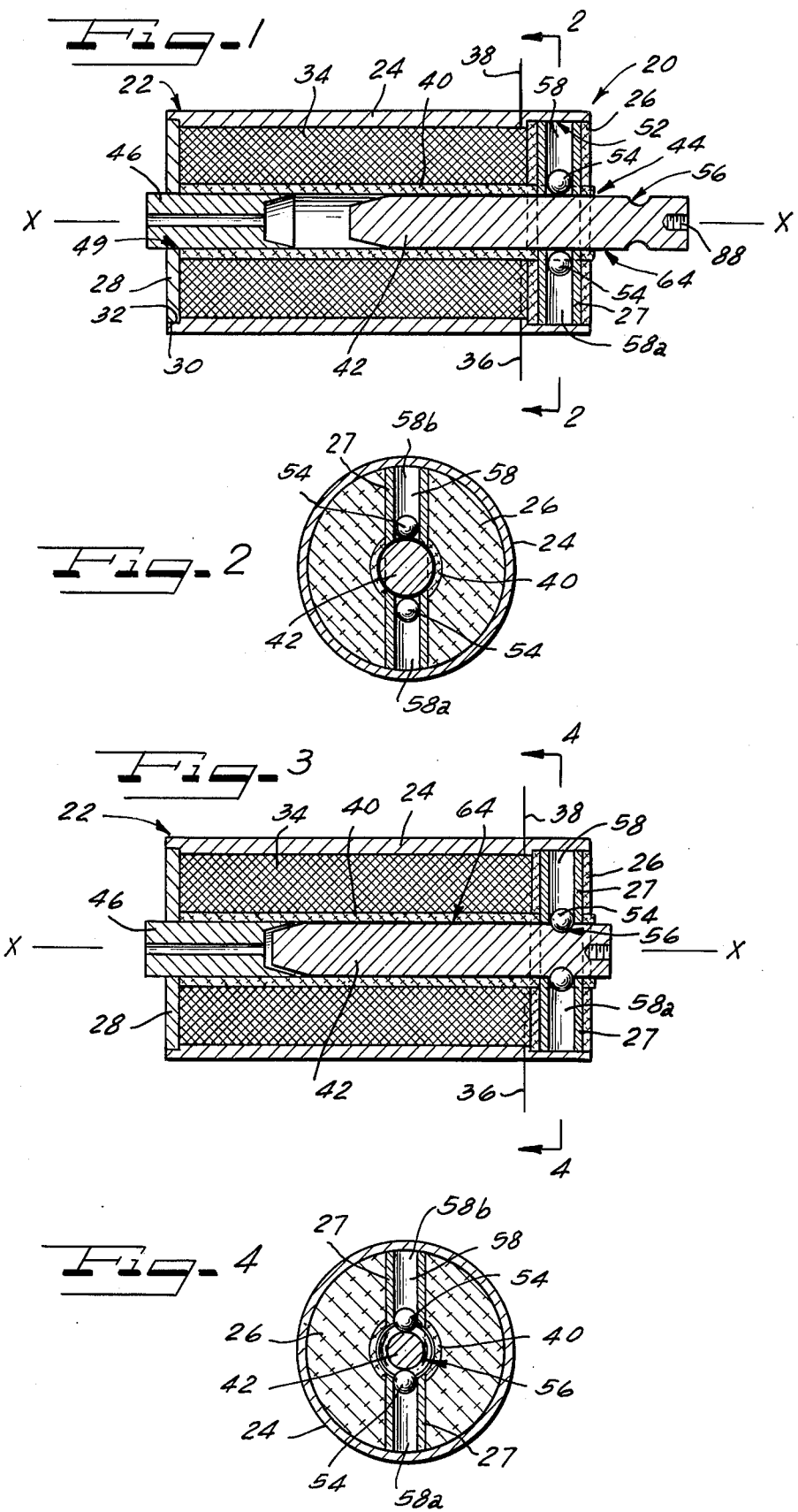

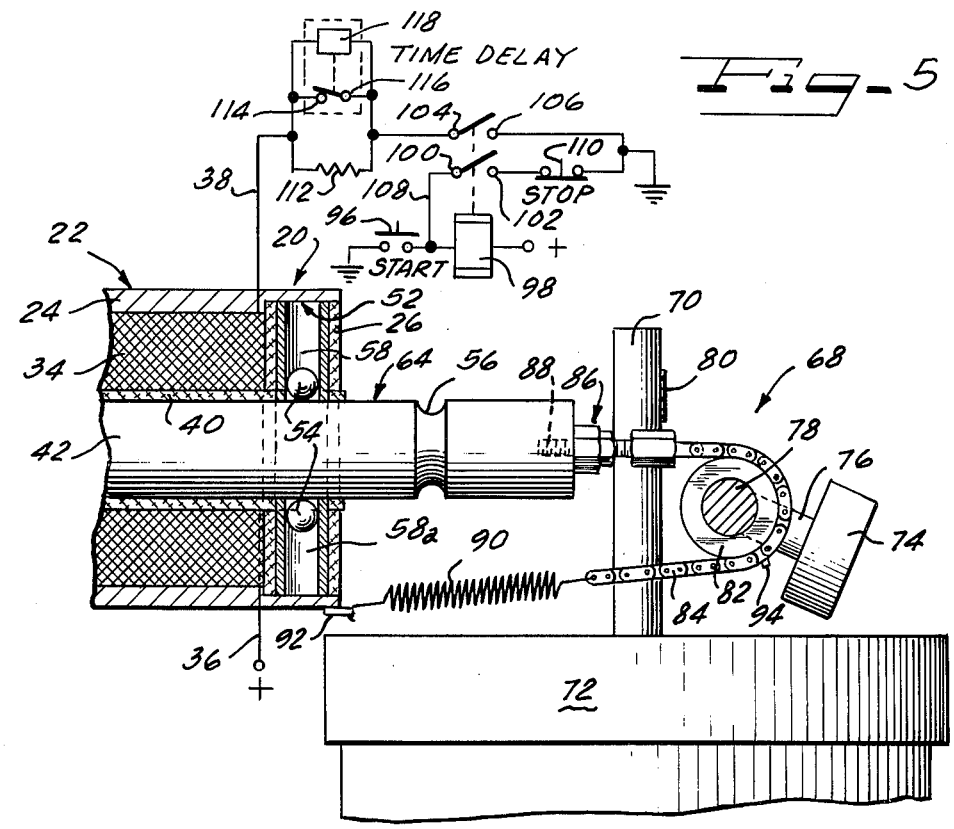
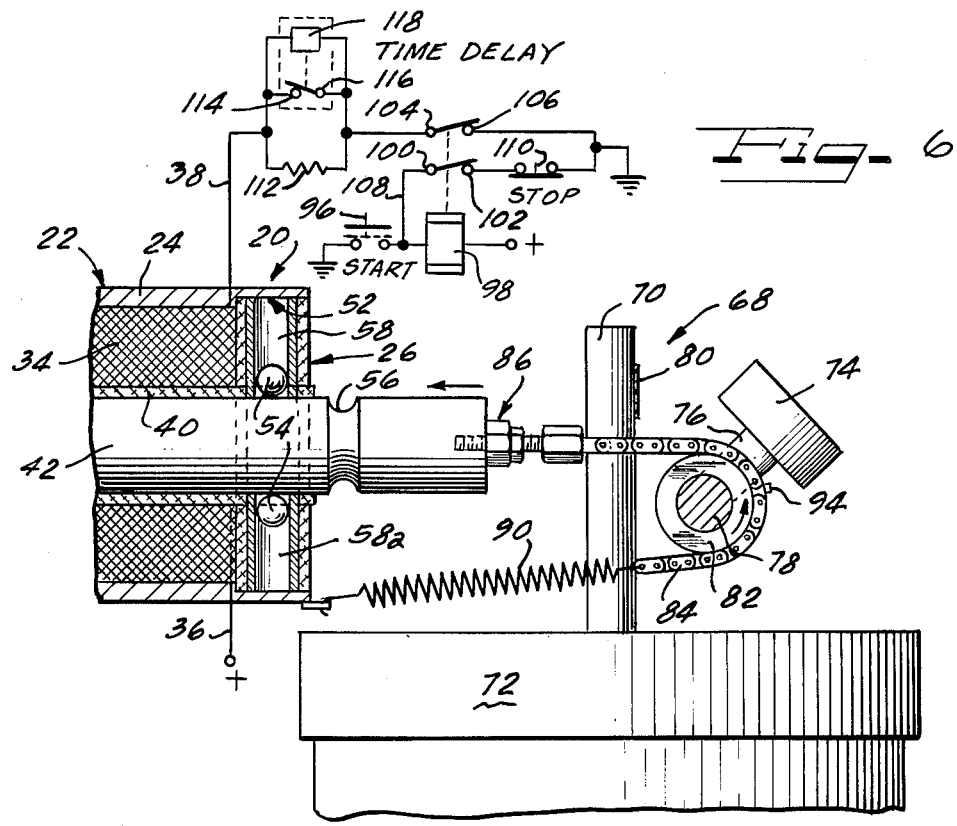

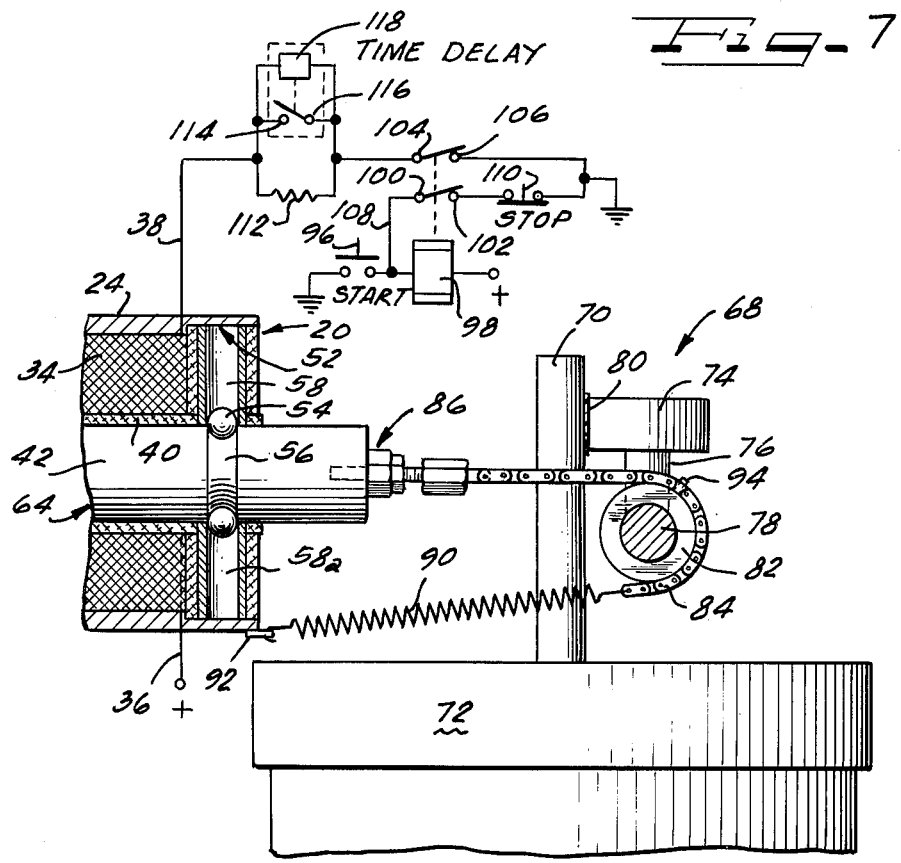
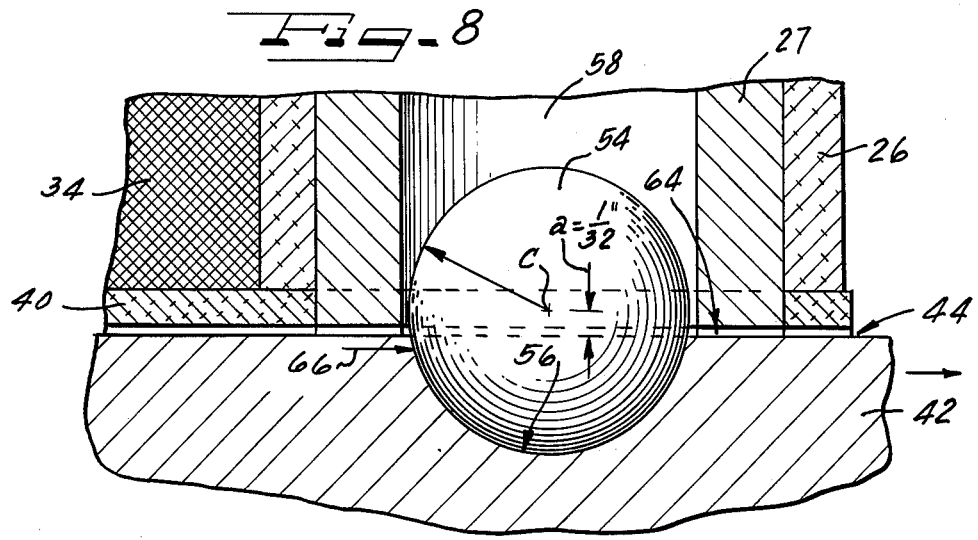

BALL LATCH SOLENOID AND TAPE TRANSPORT MECHANISM INCORPORATING SAME

BACKGROUND OF THE INVENTION

This invention belongs to the field of solenoids and equipment employing same such as tape transport mechanisms.

A tape transport mechanism is one example where, conventionally, a rather large solenoid has been required to move a pressure roller to hold a tape against a rotating capstan in play mode. As long as the machine is running, the pressure roller must be held in this position. Typically, it will require 24 Watts of electric power to pull the pressure roller to play position, and will require the same continuous power input to the solenoid to hold it in play position. This is wasteful of power, and generates heat.

SUMMARY OF THE INVENTION

It is a general object of the present invention to provide a solenoid which can maintain a high applied load for an extended time with very low electric power input.

Another object is to provide a solenoid with magnetic latch means operable in response to the magentic field of the solenoid coil to hold the solenoid plunger in a working position.

Another object is to provide a solenoid in which the magnetic plunger can be moved to a high load working position by the magnetic field generated in response to initial high electric power input to the solenoid coil, and the plunger can be maintained in that working position for an extended time by a reduced magnetic field applied to magnetic latch means generated in response to a relatively low, sustaining electric power input to the solenoid coil.

Another object is to provide, in a solenoid, magnetic latching means consisting of at least one magnetic ball freely movable in a ball guideway to a latching position interlocking the solenoid frame and plunger by the magnetic field generated in response to electric power input to the solenoid coil.

Another object is to provide mechanism employing a solenoid with magnetic latching means according to the present invention, in which automatic control means initially applies high electric power input to the solenoid coil to move the plunger to a high load working position where it is held by the magnetic latching means, and the automatic control means then applies a reduced, sustaining electric power input to the solenoid coil just sufficient to maintain the plunger in place by holding the magnetic latching means in latching position.

Other objects and advantages will be apparent from the following description taken in connection with the drawings in which:

FIG. 1 is a longitudinal cross-sectional view of a solenoid illustrating the present invention, the magnetic plunger of the solenoid being shown in an extended, unlatched position;

FIG. 2 is a transverse cross-section of FIG. 1, taken along line 2—2;

FIG. 3 is a view similar to FIG. 1, the solenoid plunger being shown in fully retracted, latched position;

FIG. 4 is a transverse cross-section of FIG. 3, taken along line 4—4;

FIG. 5 is a fragmentary, schematic view of a tape transport mechanism using a solenoid made according to the present invention to move a pressure roller toward a capstan, the mechanism being shown in off mode, the solenoid being shown in extended position with the pressure roller swung away from the capstan;

FIG. 6 is a view similar to FIG. 5, at the beginning of the play mode, showing the solenoid coil fully energized, pulling the armature plunger inward, and swinging the pressure roller toward the tape and the capstan;

FIG. 7 is a view similar to FIGS. 5 and 6, illustrating the mechanism in the play mode, showing the solenoid plunger fully retracted, and the pressure roller pressing the tape into firm frictional engagement with the capstan, the solenoid coil being only partially energized, just sufficiently to hold the magnetic ball latch elements in latching positions; and FIG. 8 is a fragmentary enlarged view of either FIG. 3 or FIG. 7 illustrating the mechanical forces which automatically cam the ball latch elements to unlatched positions and release the plunger when the solenoid coil is deenergized.

Like parts are referred to by like reference characters.

DETAILED DESCRIPTION OF THE PREFERRED EMBODIMENT

Referring now to the specific embodiment of the invention shown in the drawings, a solenoid 20 has a housing or frame 22. This comprises an outer tubular wall 24 and front and rear annular end walls 26 and 28. Walls 24, 26 and 28 are made of iron or steel or other magnetic material. Radial sleeves 27 are made of iron or steel or other magnetic material. The circular outer edge 30 of the rear end wall is assembled in any suitable manner, as for instance, by a press fit within counterbore 32 in the outer tubular wall 24. A coil 34, electrically energizable through conductors 36 and 38, is in the annular cross-section space between the outer tubular wall 24 and an inner tubular wall 40 which may be made of brass or other non-magnetic material. An armature or plunger 42 is slidably fitted in the inner tubular wall 40 for linear movement in and out along the axis X—X through a plunger opening 44 in the front wall. A butt piece 46 is fixed as by a tight press fit in a central opening 49 in the rear end wall 28. Both the plunger and butt piece are made of iron or other magnetic material.

The front wall 26 may be assembled by press fitting it into counterbore 52 in the front end of the outer tubular wall 24.

An important feature of the invention is the magnetic latching provided by the magnetic sleeves 27, magnetic ball detent elements 54, and a groove or recess 56 in the plunger 42. As shown in FIGS. 2 and 4, there are two ball guide sleeves 27 in end wall 26. These provide radial ball guideways designated 58 and 58a made by drilling a single radial bore edgewise through member 26. The magnetic detent balls 54 are freely movable, radially, toward and away from the plunger 42 in the respective guideways. While steel balls are preferred for the magnetic latching elements, because they move with minimum friction, other shapes may be employed as long as they move relatively freely within the respective guideways.

The flux path of the magnetic field generated when the coil is energized is completed through the plunger 42, butt piece 46, rear end wall 28, outer tubular wall 24, sleeve 27, and the steel balls 54. Thus, when the coil 34 is energized, the balls are attracted radially inwardly against the periphery of the plunger. As shown in FIGS. 1 and 2, this occurs simultaneously with inward movement of the plunger, in this case the balls riding, slipping and rolling with substantially no friction against the outer perimeter 64 of the plunger.

The magnetic sleeves 27, within the non-magnetic front end wall 26, provide a convenient means for concentrating the flux paths around the balls 54. Alternatively, however, the entire end wall 26 may be made of magnetic material, thereby eliminating the need for the separate magnetic sleeves 27.

As shown in FIGS. 3 and 4, the groove 56 is positioned along the periphery of the plunger for engaging the balls 54 at the fully retracted position. This is just short of contacting the butt piece 46. This enables the balls to be drawn magnetically into the groove 56 just prior to the plunger striking noise normally associated with solenoids and which is objectionable where quiet installations are required in commercial broadcasting equipment and the like.

By way of a specific example, the balls 54 may be 0.250 inches diameter; the guideways 58, 58a, may be about 0.001 inches oversize; and the radius of the groove 54 may be somewhere between that of the balls 54 and that of the guideways. As shown in FIG. 8, the depth of the groove 56 will preferably be less than the radius of the balls. As shown, the center "c" of each ball is about 1/32 inch exteriorly of the plunger periphery 64. Thus, when the coil is deenergized and the plunger pulled outwardly by the usual spring biasing means (to be described), a load applied to the balls, as illustrated by the arrow 66 in FIG. 8, will readily and effortlessly unlatch the plunger by displacing the balls outwardly from the recess or groove 56 into their respective guideways.

Although two balls 54 are shown in two separate guideways, more or less, may be employed. A single ball in a single guideway will suffice for many purposes, providing all the advantages of the invention including quiet operation, positive latching, and effortless unlatching.

A specific example of the improved solenoid 20, incorporated in a tape transport mechanicm, is shown schematically in FIGS. 5-8. A capstan 70 is driven at constant speed by an electric motor 72. A pressure roller 74 is rotatably journaled on a shaft 76 which is fastened radially to a rotatably oscillatable cross shaft 78. The latter is journaled (by means not shown) to oscillate and enable the pressure roller to be swung between the off mode or at rest position shown in FIG. 5, through the intermediate position shown in FIG. 6, to the play mode or operating position shown in FIG. 7. A magnetic tape 80 is trained for movement along a path between the capstan and pressure roller.

A collar 82 is fastened to the shaft 78 and is oscillatable with it. A flexible chain 84 is fastened at one end to the plunger by coupling means 86 engaged with the threaded opening 88. The chain is fastened at its other end to a biasing spring 90 which is fixed to an eye 92 on the solenoid housing.

A pin 94 fastened to the collar 82 engages an intermediate part of the chain. Energization of the coil 34 pulls the plunger 42 inward (to the left in the figures) and, by means of the chain 84, pulls the pressure roller 74 counterclockwise, through the position of FIG. 6, to the position of FIG. 7 where the pressure roller presses the tape against the capstan in the play mode; and deenergization of the coil enables the spring 90 to pull the plunger outward and move the pressure roller clockwise to the off mode position of FIG. 5.

The automatic control means which applies the high electric power input to the solenoid coil, and then automatically reduces the input power to a value sufficient to hold the balls in latched position, for extended times, during the play mode, will now be described.

Assuming the mechanism is in the off mode shown in FIG. 5, the play mode is initiated by momentarily closing the start switch 96. This energizes the relay 98 and closes contacts 100, 102 and 104, 106 thereof, as shown in FIG. 6. The relay 98 is held energized by its locking circuit, namely, conductor 108, closed contacts 100, 102, and the normally closed stop switch 110. The closing of contacts 104, 106 energizes coil 34 through conductors 36, 38, and through resistor 112 and contacts 114, 116 of time delay relay 118 which are in parallel.

Time delay relay 118 is arranged to automatically open contacts 114, 116 after a predetermined time sufficient to pull the pressure roller 74 to the latched, play position of FIG. 7. This may be from a few tenths of a second to a minute or so, as required by the specific application. In the present case, FIG. 6 illustrates the dynamic position when the coil 34 is fully energized through time delay contacts 114, 116 to move the plunger 42 inwardly while the ball detent elements 54 are attracted to the outside periphery of the plunger and the pressure roller is swinging counterclockwise toward the capstan. FIG. 7 shows the position after the plunger 42 is moved to the fully retracted position, the pressure roller 74 being in play position and the balls 54 being seated in groove 56 to latch the plunger in place. The coil is still energized, but with considerably less power input, through resistor 112, sufficiently to hold the balls in the groove and lock the plunger against outward movement.

In a typical tape transport mechanism employing the present invention, as shown in FIGS. 5-8, the coil 34 may for example have a full 120 volts applied to it when time delay contacts 114, 116 are closed as shown in FIG. 6, providing an input of about 24 watts. This will cause the pressure roller to press the tape against the capstan with a force of about 4 pounds. In the FIG. 7 position, after the pressure roller is fully engaged with the tape and the coil 34 is energized solely through the resistor 112, the voltage across the coil will drop to about 24 volts, reducing the electric power input to about 1 watt. This power input is insignificant from the standpoint of heat generation and energy waste, and can be maintained indefinitely to hold the balls 54 in latching position, and maintain the full 4 pound pressure against the tape for as long as desired.

The play mode is terminated by momentarily opening stop switch 110. This opens the hold circuit 108 for the relay 98, deenergizing it and opening its contacts 100, 102 and 104, 106. This deenergizes the coil 34, killing the small magnetic field holding the balls 54 in the groove 56. The outward pull of biasing spring 90, applied to the balls 54 at the position indicated by arrow 66 in FIG. 8, causes the back edge of the groove 56 to cam the balls outwardly into their respective guideways, releasing the plunger 42, which, with the pressure roller 74, are then pulled back to their off positions shown in FIG. 5, ready for the next play cycle.

The above described solenoid 20 and the one example of the tape transport mechanism 68 employing the solenoid, are illustrative of a small number of many possible specific embodiments of the invention. Other arrangements can readily be devised in accordance with the principles disclosed without departing from the spirit and scope of the invention.

The embodiments of the invention in which an exclusive property or privilege is claimed are defined as follows:

1. In a tape transport mechanism having tape drive means for moving magnetic tape along a path between a capstan and a pressure roller, a solenoid having a housing with a plunger opening at one end, an electrically energizable coil in said housing aligned with said plunger opening, a plunger extending through said opening into said coil and being inwardly movable by a magnetic field generated in response to energizing said coil, means connecting said plunger and pressure roller for moving said pressure roller toward said capstan in response to inward movement of said plunger, biasing means urging said pressure roller away from said capstan, improved means for controlling movement of said pressure roller comprising:

said housing having at least one ball guideway radially disposed relative to the axis of mevement of said plunger and having an open end adjacent said plunger, said ball guideway being in said magnetic field;

at least one magnetizable ball freely movable within said guideway and being magnetically attractable toward said plunger by said magnetic field;

said plunger having a recess in the external surface thereof, said recess being positioned along said plunger for alignment with said ball guideway when said plunger is in a fully retracted position corresponding to a play mode position of the pressure roller pressing tape against the capstan; and means for electrically energizing said coil for generating said magnetic field of sufficient magnitude to simultaneously move said plunger inwardly to said fully retracted position and to move said ball toward said plunger to a latching position within said guideway and said recess.

2. In a tape transport mechanism, the combination of claim 1 in which said means for electrically energizing said coil includes means effective, after said ball is moved to said latching position, to reduce the electrical energization of said coil to reduce said magnetic field to a magnitude sufficient to hold said ball in said latching position to thereby maintain said pressure roller in said play mode position with a reduced electrical energization.

3. In a tape transport mechanism, the combination of claim 2 in which said ball is released from said latching position in response to further reducing the electrical energization of said coil thereby enabling said biasing means to move said pressure roller away from said capstan.

4. In a tape transport mechanism, the combination of claim 2 in which the means for controlling movement of said pressure roller includes time delay means for energizing said coil for a predetermined time period to generate said magnetic field of magnitude sufficient to move said plunger to said fully retracted position while moving said ball to said latching position; and, said time delay means effective on termination of said predetermined time period for reducing the energization of said coil to a magnitude just sufficient to hold said ball in said latching position.

5. In a solenoid having a housing with a plunger opening at one end, an electrically energizable coil in said housing, a magnetic plunger extending through said opening into the magnetic field of said coil, said plunger being inwardly movable by the magnetic field of said coil when energized, the improvement comprising:

said housing having at least one ball guideway radially disposed relative to the axis of movement of said plunger and having an open end adjacent said plunger, the wall of said ball guideway being of magnetic material and located in said magnetic field;

at least one magnetic ball freely movable within said guideway and being magnetically attracted toward said plunger by said magnetic field;

said plunger having a recess in an external surface thereof facing said open end of said guideway, said recess being positioned along the length of said plunger for alignment with said guideway when said plunger is in a retracted operating position;

said plunger being movable to said retracted operating position simultaneously with movement of said ball to a latching position in said recess, in response to generation of said magnetic field by energization of said coil; and said plunger being held against movement from said retracted operating position, while said ball is maintained in said latching position by the attraction of said magnetic field.

6. In a solenoid, the combination of claim 5 in which said recess has an arcuate cross-section with a radius substantially the same as the radius of said ball, and the radius of the ball exceeds the depth of the recess to facilitate dislodgement of the ball from the recess when the coil is deenergized.

7. In a solenoid, the combination of claim 5 in which said ball guideway is formed in an end of the housing adjacent said plunger opening.

8. In a solenoid, the combination of claim 5 in which said housing has a magnetic butt piece at the inner end of the plunger, and said ball and recess are positioned to stop inward movement of the plunger just short of and before contact with said butt piece.

9. In a solenoid, the combination of claim 5 including biasing means urging said plunger outward away from said retracted operating position;

an electrical current of a first predetermined magnitude in said coil being effective to generate said magnetic field of a strength sufficient to move said plunger against said biasing means to said retracted operating position while simultaneously moving said ball to said latching position within said guideway and said recess;

an electrical current in said coil of a second predetermined magnitude less than said first predetermined magnitude being effective to generate said magnetic field of strength sufficient to hold said ball in said latching position and thereby prevent movement of said plunger away from said retracted operating position by said biasing means; and said ball being releasable from said latching postion, to enable said biasing means to move said plunger, in response to diminishing said magnetic field by reducing the electric current in said coil below said second predetermined magnitude.

10. In a solenoid, the combination of claim 5 in which the wall of said ball guideway comprises a tube of magnetic material, said magnetic field being concentrated in said tube around said ball.

11. In a solenoid, the combination of claim 5 in which said housing includes coaxial outer and inner tubular walls respectively outside and inside of said coil, said outer tubular wall being of magnetic material, said plunger being guided within said inner tubular wall for axial movement into and out of said housing, rear and front end walls connecting rear and front ends of said outer and inner tubular walls respectively, said rear end wall being of magnetic material, said front end wall having said plunger opening therein and aligned with said inner tubular wall, said rear end wall having a butt piece of magnetic material mounted thereon in axial alignment with said plunger, said rear end wall being connected in close magnetic flux conducting relation with said butt piece and outer tubular wall respectively, to provide a continuous flux path therethrough, and said wall of said ball guideway being a tube of magnetic material extending in a radial relation to the plunger from a position closely adjacent the periphery of said plunger to a connection with said outer tubular wall, whereby said magnetic field at the housing front end wall is concentrated in said tube about said ball.

* * * * *